US012658338B2

(12) United States Patent
Granig

(10) Patent No.: US 12,658,338 B2
(45) Date of Patent: Jun. 16, 2026

(54) GRAPHENE IN ELECTROMAGNETIC SYSTEMS

(71) Applicant: Infineon Technologies Austria AG, Villach (AT)

(72) Inventor: Wolfgang Granig, Seeboden (AT)

(73) Assignee: Infineon Technologies Austria AG, Villach (AT)

( * ) Notice: Subject to any disclaimer, the term of this patent is extended or adjusted under 35 U.S.C. 154(b) by 908 days.

(21) Appl. No.: 17/880,031

(22) Filed: Aug. 3, 2022

(65) Prior Publication Data

US 2024/0047096 A1 Feb. 8, 2024

(51) Int. Cl.
*H01B 1/04* (2006.01)
*H01F 41/04* (2006.01)

(52) U.S. Cl.
CPC ............... *H01B 1/04* (2013.01); *H01F 41/04* (2013.01)

(58) Field of Classification Search
CPC ......... H01F 27/2823; H01F 2027/2809; H01F 27/2804; H01F 27/28; H01F 27/30; H01F 27/32; H02K 3/02; H02K 3/04; H02K 3/28
USPC .................. 336/200, 232, 83, 212, 182, 221
See application file for complete search history.

(56) References Cited

U.S. PATENT DOCUMENTS

2016/0336103 A1 11/2016 Giezendanner-Thoben et al.

FOREIGN PATENT DOCUMENTS

| | | | | | |
|---|---|---|---|---|---|
| CN | 101106011 A | * | 1/2008 | | H05B 6/662 |
| CN | 107958766 A | * | 4/2018 | | H01F 27/28 |
| CN | 214897987 U | * | 11/2021 | | |
| EP | 3605564 A1 | | 2/2020 | | |
| EP | 3863030 A1 | * | 8/2021 | | H01F 41/02 |
| WO | 2022013138 A1 | | 1/2022 | | |

OTHER PUBLICATIONS

Balandin, Alexander A. et al., "Superior Thermal Conductivity of Single-Layer Graphene." Nano Letters. vol. 8. No. 3. 2008. pp. 902-908. doi: 10.1021/nl0731872.

Choi, Jang-Young et. al., "Improved Analytical Model for Electromagnetic Analysis of Axial Flux Machines With Double-Sided Permanent Magnet Rotor and Coreless Stator Windings." in IEEE Transactions on Magnetics. vol. 47. No. 10. pp. 2760-2763. Oct. 2011. doi: 10.1109/TMAG.2011.2151840.

MCI Brochure. "HiPoD: High Power Drone, Modular GaN Inverter for High-Speed Motors.".

Rizzi, Leo et. al., "Quantifying the influence of graphene film nanostructure on the macroscopic electrical conductivity." Nano Express. IOP Publishing. 2020. pp. 1-9. doi: https://doi.org/10.1088/2632-959X/abb37a.

Schiest, Martin et. al., "Development of a High Power Density Drive System for Unmanned Aerial Vehicles", IEEE Transactions on Power Electronics. vol. 36. No. 3. Mar. 2021. pp. 1-13. doi: 10.1109/TPEL.2020.3013899.

(Continued)

*Primary Examiner* — Lincoln D Donovan
(74) *Attorney, Agent, or Firm* — Harrity & Harrity, LLP

(57) ABSTRACT

A transformer includes a winding configured to carry a current. The winding includes a conductor structure through which the current flows and a graphene layer arranged in direct contact with the conductor structure.

3 Claims, 4 Drawing Sheets

(56) References Cited

OTHER PUBLICATIONS

Yang, Jian et. al., "Improving the electrical conductivity of copper/graphene composites by reducing the interfacial impurities using spark plasma sintering diffusion bonding." Journal of Material Research and Technology. vol. 15. 2021. pp. 3005-3015. https://doi.org/10.1016/j.jmrt.2021.09.100.
Partial European Search Report for Application No. EP23189168.0, mailed on Jan. 2, 2024, 12 Pages.
Extended European Search Report for Application No. EP23189168, mailed on Mar. 28, 2024, 11 pages.

* cited by examiner

GRAPHENE IN ELECTROMAGNETIC SYSTEMS

BACKGROUND

The technical problem today for many electrical systems like power-converters (DCDC, ACDC, chargers, etc.) and drives (e-avionics, cobots, scooters, etc.) is to apply power-dense conversion as well as lightweight propulsion and drives.

Today, motors are built of massive materials comprising iron-alloys to transfer the magnetic fields. A solution to this problem is to use axial-flux motors since they are more flat and integration of further components can be done there. One problem in axial-flux motors is that the motor windings need to carry a large amount of current because they are low-ohmic and also low inductive. Low resistance is maintained today with copper-thickness of the wires, and low inductance results in the need of high-frequency switching of inverters. This leads to increased resistance by skin-effect and proximity effects. Increased resistance leads to higher temperatures. In other words, due to skin effects caused by switching at high frequencies, the conductivity of the motor windings will be decreased at high frequencies where the current is transported on the surface of the motor windings.

Another problem arises from high-integrated switched mode power supplies. They need transformers for electrical decoupling of primary high-voltage side to the low-voltage side by highly efficient and dense transfer of electrical energy. This is realized by increasing the switching frequencies and implementing flat planar transformers. Due to the high power-density, the sheet-current is very high, and even higher due to the skin-effect when operating at high frequencies. Again, due to skin effects caused by switching at high frequencies, the conductivity of the transformer windings will be decreased at high frequencies where the current is transported on the surface of the transformer windings. The decrease in conductivity leads to higher temperatures.

Therefore, improved electromagnetic systems with increased conductance on the conductor surface of the windings and improved cooling may be desirable.

SUMMARY

One or more embodiments provide a transformer that includes a winding configured to carry a current. The winding includes a conductor structure through which the current flows and a graphene layer arranged in direct contact with the conductor structure.

One or more embodiments provide an axial flux motor, including: a stator including a stator shaft that extends in an axial direction and stator disc mechanically coupled to the stator shaft and extending in a radial direction, wherein the stator disc includes a plurality of phase windings, wherein each phase winding includes a conductor winding through which a respective phase current flows and a first graphene layer arranged on the conductor winding in direct contact therewith; and a rotor including a plurality of permanent magnets arranged around the stator shaft with alternating magnetization directions that are aligned parallel or antiparallel to the axial direction, wherein the plurality of permanent magnets are configured to interact with electromagnetic fields produced by respective phase currents flowing through the plurality of phase windings.

One or more embodiments provide a permanent magnet motor, including: a plurality of phase windings formed by conductor windings, wherein each phase winding includes a respective conductor winding through which a respective phase current flows and a respective graphene layer arranged on the respective conductor winding in direct contact therewith.

One or more embodiments provide an induction system, including: a rotor including a rotor shaft that extends in an axial direction and rotor disc mechanically coupled to the rotor shaft and extending in a radial direction, wherein the rotor disc includes a plurality of shortcut windings, wherein each shortcut winding includes a first conductor winding through which a respective induced current of a plurality of induced currents flows and a first graphene layer arranged on the first conductor winding in direct contact therewith; and a stator. The stator includes: a first stator disc that is rotationally fixed, wherein the first stator disc includes a plurality of first stator phase windings, wherein each first stator phase winding includes a second conductor winding through which a respective first stator phase current of a plurality of first stator phase currents flows and a second graphene layer arranged on the second conductor winding in direct contact therewith; and a second stator disc that is rotationally fixed, wherein the second stator disc includes a plurality of second stator phase windings, wherein each second stator phase winding includes a third conductor winding through which a respective second stator phase current of a plurality of second stator phase currents flows and a third graphene layer arranged on the third conductor winding in direct contact therewith, wherein the rotor disc is arranged between the first stator disc and the second stator disc.

BRIEF DESCRIPTION OF THE DRAWINGS

Embodiments are described herein making reference to the appended drawings.

DETAILED DESCRIPTION

Figure 1A:
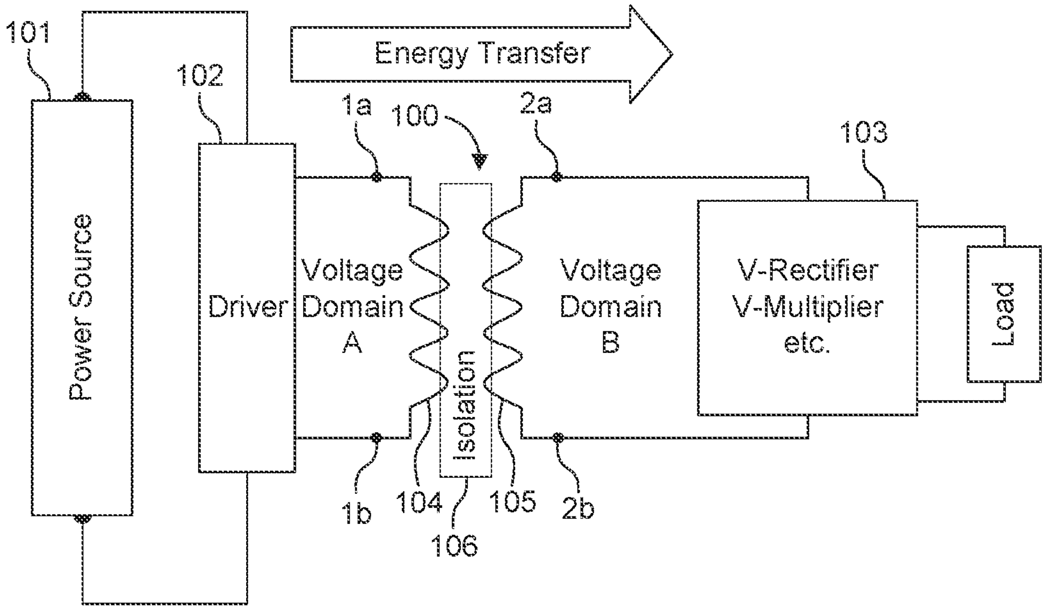
FIG. 1A shows a schematic block diagram of an energy transfer circuit using a transformer according to one or more embodiments.

In the following, details are set forth to provide a more thorough explanation of the exemplary embodiments. However, it will be apparent to those skilled in the art that embodiments may be practiced without these specific details. In other instances, well-known structures and devices are shown in block diagram form or in a schematic view rather than in detail in order to avoid obscuring the embodiments. In addition, features of the different embodiments described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

In this regard, directional terminology, such as "top", "bottom", "below", "above", "front", "behind", "back", "leading", "trailing", etc., may be used with reference to the orientation of the figures being described. Because parts of embodiments can be positioned in a number of different orientations, the directional terminology is used for purposes of illustration. It is to be understood that other embodiments may be utilized and structural or logical changes may be made without departing from the scope defined by the claims. The following detailed description, therefore, is not to be taken in a limiting sense. Directional terminology used in the claims may aid in defining one element's spatial or positional relation to another element or feature, without being limited to a specific orientation.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In embodiments described herein or shown in the drawings, any direct electrical connection or coupling, i.e., any connection or coupling without additional intervening elements, may also be implemented by an indirect connection or coupling, i.e., a connection or coupling with one or more additional intervening elements, or vice versa, as long as the general purpose of the connection or coupling, for example, to transmit a certain kind of signal or to transmit a certain kind of information, is essentially maintained. Features from different embodiments may be combined to form further embodiments. For example, variations or modifications described with respect to one of the embodiments may also be applicable to other embodiments unless noted to the contrary.

The terms "substantially" and "approximately" may be used herein to account for small manufacturing tolerances (e.g., within 5%) that are deemed acceptable in the industry without departing from the aspects of the embodiments described herein. For example, a resistor with an approximate resistance value may practically have a resistance within 5% of that approximate resistance value.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

One or more embodiments is directed to an electromagnetic system (e.g., a 3-phase motor, a transformer, or an electric generator) that uses graphene covered conductors to overcome the aforementioned issues with carrying large amount of current and/or skin effects resulting from high switching frequencies. Graphene covered conductors in such systems will improve the situation significantly by increased conductance on the conductor surface of the windings and improved cooling. Thus, embodiments are directed to graphene covered conductors to increase the electrical conductivity and thermal conductivity of winding coils (e.g., motor windings, transformer windings, and electric generator windings). The conductivity will be increased in DC but also in case of high frequency where the current is transported on the conductor surface due to skin effects. The graphene covered conductors may be used in high power density electrical power supplies, where planar transformers are used. In high-power density electrical drives, high switching frequencies are used applying new wide-bandgap semiconductors. Also, the size of motors can be reduced by using coreless stators with reduced thickness. This increases the effectivity and efficiency of this type of motor. It will be appreciated that the terms "coil" and "winding" may be used interchangeably herein.

FIG. 1A shows a schematic block diagram of an energy transfer system using a transformer 100 according to one or more embodiments. The transformer 100 is used to transfer energy or power between two voltage domains in a DC-DC converter application. The energy transfer system 100 includes a power source 101, a driver 102, and a voltage converter 103 electrically coupled to a load. Inductive (magnetic) coupling between two voltage domains A and B of the energy transfer system is achieved by forming a winding on each side of an isolation region. Thus, the transformer 100 includes a primary winding 104, a secondary winding 105, and an isolation region 106 that spatially separates and isolates the two winding 104 and 105. The primary winding 104 extends from terminal 1*a* to terminal 1*b* and the secondary winding 105 extends from terminal 2*a* to terminal 2*b*. The two windings 104 and 105 are magnetically coupled to each other across the isolation region 106 such that a magnetic field produced by a current flowing through primary winding 104 induces a current to flow through secondary winding 105.

On the primary side (e.g., voltage domain A), the driver 102 operates in a push-pull mode, a fly-back mode, or other DC-DC converter mode. Thus, the driver 102 includes appropriate push-pull converter circuitry, fly-back converter circuitry, etc. to supply energy to a primary winding 104 according to a power conversion scheme.

On the secondary side (e.g., voltage domain B), the voltage converter 103 may be a voltage rectifier or voltage multiplier coupled to a secondary winding 105. The voltage converter 103 receives the transferred energy received by the secondary winding 105 and further converts the energy to a desired supply voltage for the load.

One or both windings 104 and 105 may be covered with graphene to increase the electrical conductivity and thermal conductivity of the covered winding. In such a case, the covered winding is made of a conductor that includes, for example, copper, aluminum, or alloys thereof, and the graphene is applied directly to the surface of the conductor.

Figure 1B:
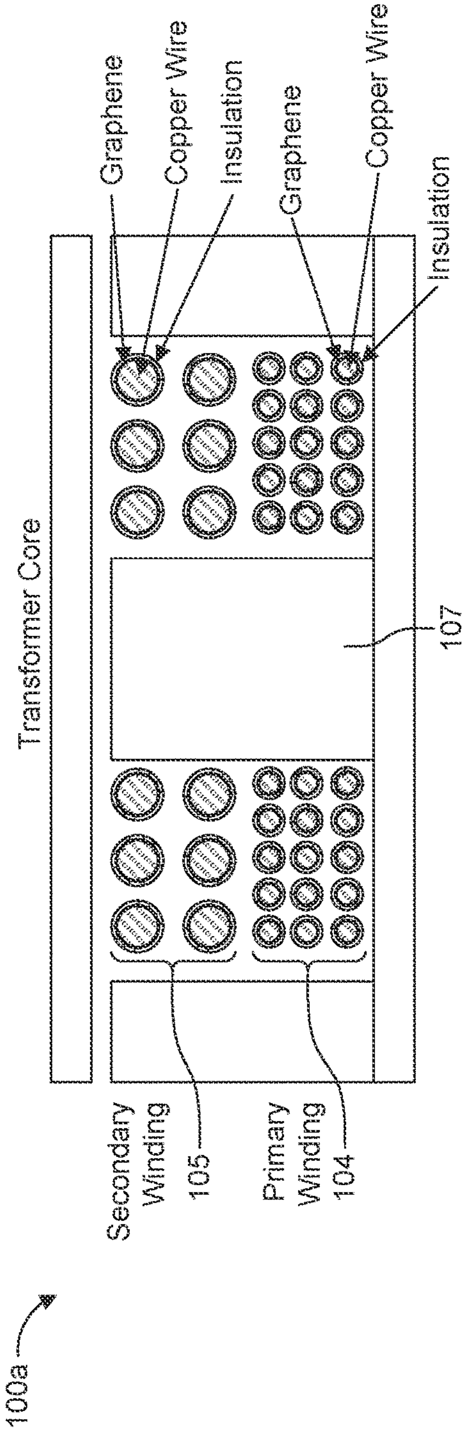
FIG. 1B shows a side view of a transformer according to one or more embodiments.

FIG. 1B shows a side view of a transformer 100*a* according to one or more embodiments. The transformer 100*a* may be used as transformer 100 in the energy transfer system described in FIG. 1A. The transformer 100*a* includes a primary winding 104 that carries a primary current and a secondary winding 105 that is magnetically coupled to the primary winding 104 and carries a secondary current. Both windings 104 and 105 may be wrapped around a transformer core 107.

Both windings 104 and 105 include respective conductor structures, such as a conductor wire. In this case, pure copper wire is shown but any appropriate conductive material may be used that carriers current according to the application. The conductor structure of winding 104 is covered by, encased by, or encapsulated by a graphene layer. The graphene layer is in direct contact with a surface of the conductor structure. Similarly, the conductor structure of winding 105 is covered by, encased by, or encapsulated by a graphene layer. The graphene layer is in direct contact with a surface of the conductor structure. In some cases, one of the windings 104 or 105 includes a graphene layer. For example, the winding having the lowest electrical and/or thermal conductivity may have a graphene layer, while the other winding may not have a graphene layer.

In addition, both windings 104 or 105 include an insulation layer that covers, encases, or encapsulates the conductor structures of the windings. If a graphene layer is disposed on the conductor structure, the insulation layer also covers, encases, or encapsulates the graphene layer. That is, the insulation layer is arranged in direct contact with the graphene layer, with the graphene layer being interposed between the conductor structure and the insulating layer.

Figure 1C:
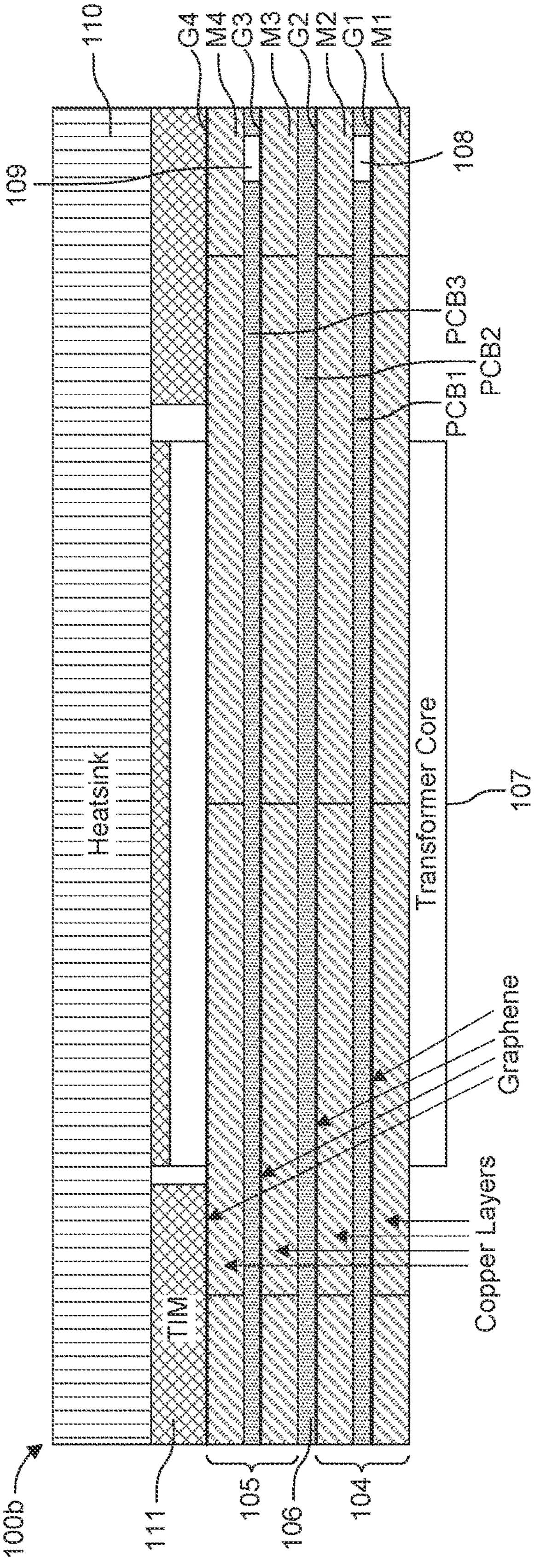
FIG. 1C shows a side view of another transformer according to one or more embodiments.

FIG. 1C shows a side view of a transformer 100*b* according to one or more embodiments. The transformer 100*b* may be used as transformer 100 in the energy transfer system described in FIG. 1A. The transformer 100*b* includes a primary winding 104 that carries a primary current and a secondary winding 105 that is magnetically coupled to the primary winding 104 and carries a secondary current. Both windings 104 and 105 may be wrapped around a transformer core 107.

In this case, the transformer 100*b* is a planar transformer that includes a multilayer stack of a plurality of layers (e.g., planar conductive layers, planar graphene layers, and planar insulating layers). The multilayer stack includes a multilayer PCB whose PCB layers are used as insulating layers. Dielectric layers could also be used. The multilayer PCB enables the advantage that power-semiconductor components can also be placed the same PCB.

Winding 104 is formed by a first layer stack or a sub-stack of the multilayer stack and winding 105 is formed by a second layer stack or a sub-stack of the multilayer stack. The two windings or two sub-stacks are separated by an isolation region 106 that includes at least one insulating layer PCB2, which may be a printed circuit board (PCB) layer or dielectric layer.

The first layer stack that forms winding 104 includes a first plurality of conductive layers M1, M2 that form a first conductor structure, where neighboring conductive layers of the first plurality of conductive layers are connected by a respective connecting via 108. The planar conductive layers may be conductive wires or conductive bars. An insulating layer PCB1 is arranged between neighboring conductive layers of the first plurality of conductive layers. A connecting via 108 extends through an insulating layer (e.g., PCB1) to directly connect two neighboring conductive layers (e.g., neighboring conductive layers M1 and M2). While only two conductive layers M1, M2 are shown, additional insulating layers and conductive layers can be added in alternating fashion depending on the number of turns desired for the winding 104, with each conductive layer corresponding to one turn. Additional connecting vias are added to connect additional pairs of neighboring conductive layers so that the first plurality of conductive layers M1, M2, etc. and their respective connecting vias 108 form a continuous conductive structure (i.e., a continuous winding).

Thus, it can be said that winding 104 is formed from vertically overlapping metal layers. The minimum number of metal layers is one, while there is no real limit to the total number of metal layers as far it is practically manufacturable. Each metal layer of winding 104 is conductively coupled to an adjacent metal layer by a metal via or other metal structure that is formed in the sub-insulator layers located between the two adjacent metal layers.

The first layer stack that forms winding 104 further includes a graphene layer G1, G2 for each conductive layer M1, M2. Each graphene layer is arranged on and in direct contact with a respective conductive layer of the first plurality of conductive layers of winding 104. Thus, graphene layer G1 is deposited directly on a surface of conductive layer M1 and graphene layer G2 is deposited directly on a surface of conductive layer M2. Each insulating layer of the first layer stack is arranged directly between a graphene layer and a conductive layer.

Each connecting via 108 is directly coupled to respective neighboring conductive layers of the first plurality of conductive layers and extends through a respective graphene layer and a respective insulating layer in order to couple the respective neighboring conductive layers of the first plurality of conductive layers together, thereby forming a first current path between the respective neighboring conductive layers of the first plurality of conductive layers for the primary current.

Similarly, the second layer stack that forms winding 105 includes a second plurality of conductive layers M3, M4 that form a second conductor structure, where neighboring conductive layers of the second plurality of conductive layers are connected by a respective connecting via 109. The planar conductive layers may be conductive wires or conductive bars. An insulating layer PCB3 is arranged between neighboring conductive layers of the second plurality of conductive layers. A connecting via 109 extends through an insulating layer (e.g., PCB3) to directly connect two neighboring conductive layers (e.g., neighboring conductive layers M3 and M4). While only two conductive layers M3, M4 are shown, additional insulating layers and conductive layers can be added in alternating fashion depending on the number of turns desired for the winding 105, with each conductive layer corresponding to one turn. Additional connecting vias are added to connect additional pairs of neighboring conductive layers so that the second plurality of conductive layers M3, M4, etc. and their respective connecting vias 109 form a continuous conductive structure (i.e., a continuous winding).

Thus, it can be said that winding 105 is formed from vertically overlapping metal layers. The minimum number of metal layers is one, while there is no real limit to the total number of metal layers as far it is practically manufacturable. Each metal layer of winding 105 is conductively coupled to an adjacent metal layer by a metal via or other metal structure that is formed in the sub-insulator layers located between the two adjacent metal layers.

The second layer stack that forms winding 105 further includes a graphene layer G3, G4 for each conductive layer M3, M4. Each graphene layer is arranged on and in direct contact with a respective conductive layer of the second plurality of conductive layers of winding 105. Thus, graphene layer G3 is deposited directly on a surface of conductive layer M3 and graphene layer G4 is deposited directly on a surface of conductive layer M4. Each insulating layer of the second layer stack is arranged directly between a graphene layer and a conductive layer.

Each connecting via 109 is directly coupled to respective neighboring conductive layers of the second plurality of conductive layers and extends through a respective graphene layer and a respective insulating layer in order to couple the respective neighboring conductive layers of the second plurality of conductive layers together, thereby forming a second current path between the respective neighboring conductive layers of the second plurality of conductive layers for the secondary current.

The transformer 100*b* may further include a heat sink 110 arranged proximate to winding 105 (e.g., on top of the multilayer stack) to transfer heat generated within the transformer 100*b* away from the transformer. Thus, the heat sink 110 reduces core and PCB temperatures during full-load operation. A thermal interface material (TIM) 111 may be arranged between and coupled to winding 105 and the heat sink 110 to assist in transferring heat from the winding 105 to the heat sink 110. The TIM 111 improves thermal conduction between the winding 105 and the heat sink 110. Alternatively or additionally, another heat sink (no illustrated) could be arranged proximate to winding 104 (e.g., under the multilayer stack) to transfer heat generated within the transformer 100*b* away from the transformer.

While graphene is shown to be provided on top of each conductive layer (i.e., in direct contact with an upper main surface thereof), it will be appreciated that another graphene layer could be provided in direct contact with a lower main surface of each conductive layer.

Figure 2A:
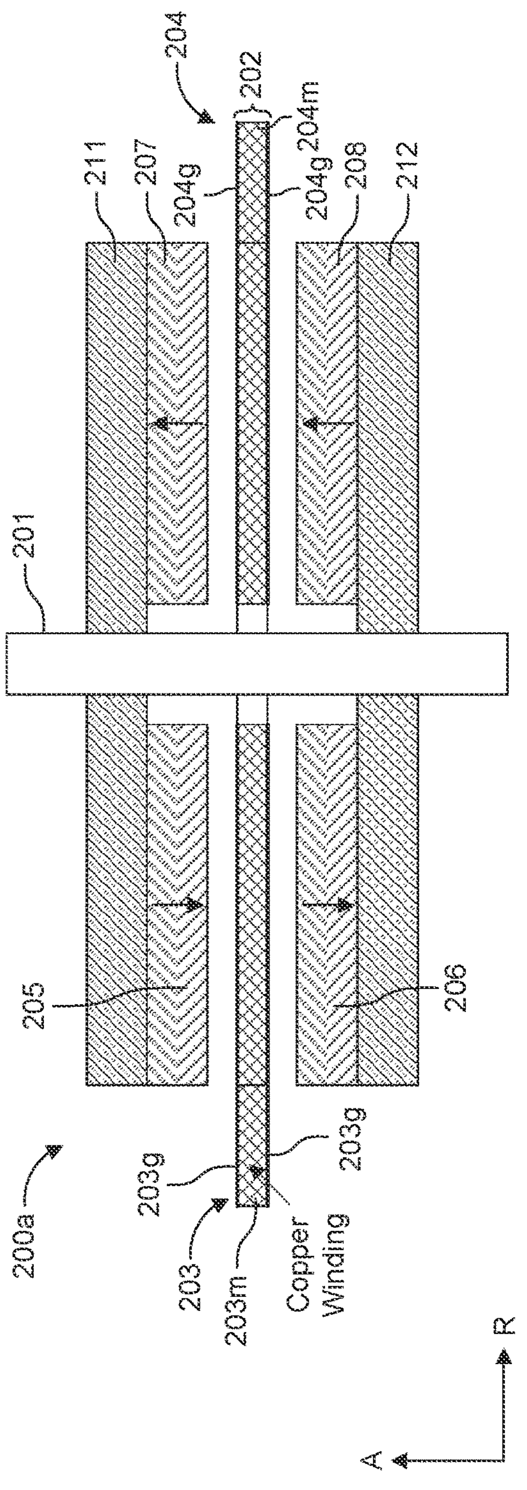
FIG. 2A shows a cross-sectional view of an axial flux motor according to one or more embodiments.

FIG. 2A shows a cross-sectional view of an axial flux motor 200*a* according to one or more embodiments. The axial flux motor 200*a* includes a stator comprising a stator shaft 201 that extends in an axial direction A and stator disc 202 mechanically coupled to the stator shaft 201 and extending in a radial direction R. The stator disc 202 includes a plurality of phase windings (e.g., at least one pair of phase windings for each motor phase). In this example, cross-sections of two phase windings 203 and 204 are shown.

Phase winding 203 includes a conductor winding 203*m* (i.e., a conductor structure) through which its respective phase current flows and one or two graphene layers 203*g* arranged on the conductor winding 203*m* in direct contact therewith. One graphene layer 203*g* is arranged on the upper main surface of the conductor winding 203*m* and the other graphene layer 203*g* is arranged on the lower main surface of the conductor winding 203*m*.

Phase winding 204 includes a conductor winding 204*m* (i.e., a conductor structure) through which its respective phase current flows and one or two graphene layers 204*g* arranged on the conductor winding 204 in direct contact therewith. One graphene layer 204*g* is arranged on the upper main surface of the conductor winding 204*m* and the other graphene layer 204*g* is arranged on the lower main surface of the conductor winding 204*m*.

The axial flux motor 200*a* further includes a rotor comprising a plurality of permanent magnets 205, 206, 207, 208, etc. arranged around the stator shaft 201. The permanent magnets 205, 206, 207, 208, etc. have alternating magnetization directions that are aligned parallel or antiparallel to the axial direction A. For example, permanent magnets 205, 206 have their magnetization directions aligned antiparallel to the axial direction A and permanent magnets 207, 208 have their magnetization directions aligned parallel to the axial direction A. Additional permanent magnets (not illustrated) are arrange circumferentially around the stator shaft 201 between permanent magnets 205 and 207 with alternating magnetization directions that are aligned parallel or antiparallel to the axial direction A. Similarly, additional permanent magnets (not illustrated) are arranged circumferentially around the stator shaft 201 between permanent magnets 206 and 208 with alternating magnetization directions that are aligned parallel or antiparallel to the axial direction A.

The plurality of permanent magnets 205, 206, 207, 208, etc. are configured to interact with electromagnetic fields produced by respective phase currents flowing through the plurality of phase windings of the stator. The interaction of the electromagnetic fields with the permanent magnets 205, 206, 207, 208, etc. causes the rotor discs 211 and 212 to rotate about the stator shaft 201, which may have ball bearings therebetween to permit the rotation.

Figure 2B:
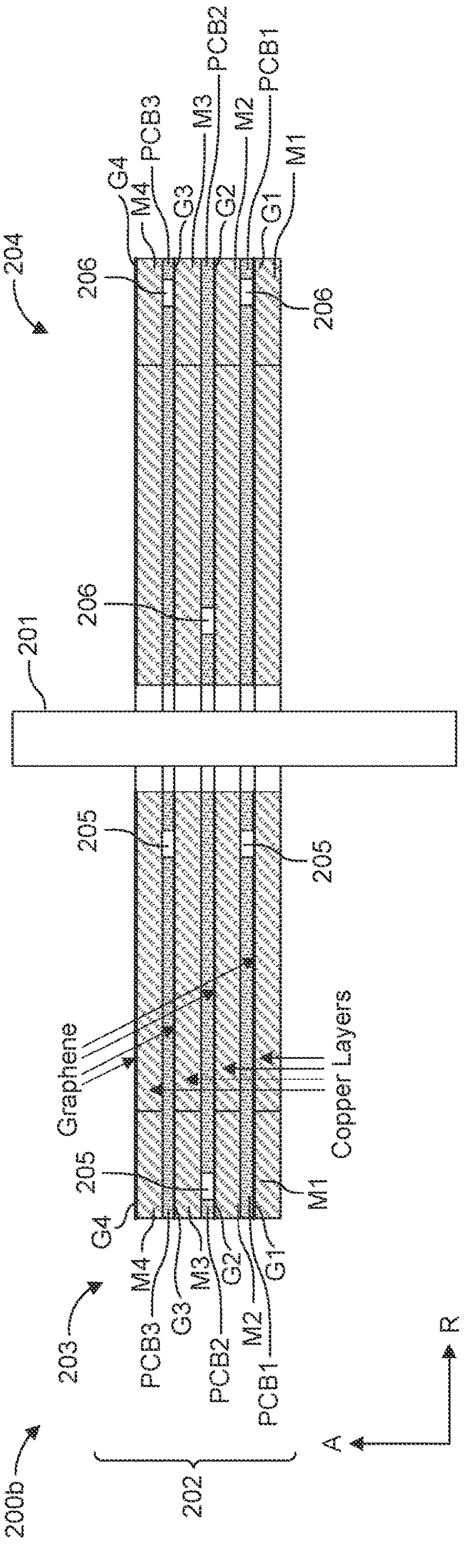
FIG. 2B shows a cross-sectional view of another axial flux motor according to one or more embodiments.

FIG. 2B shows a cross-sectional view of an axial flux motor 200*b* according to one or more embodiments. The axial flux motor 200*b* includes a stator comprising a stator shaft 201 that extends in an axial direction A and stator disc 202 mechanically coupled to the stator shaft 201 and extending in a radial direction R. The stator disc 202 includes a plurality of phase windings (e.g., at least one pair of phase windings for each motor phase). In this example, cross-sections of two phase windings 203 and 204 are shown.

It will be appreciated that the rotor of axial flux motor 200*b* is substantially the same as the rotor of axial flux motor 200*a*, and thus is omitted for the sake of simplicity. Thus, FIG. 2B focusses on the differences in the stator structure.

The stator disc 202 comprises a multilayer stack comprising a plurality of conductive layers that form the conductor windings of the plurality of phase windings; a plurality of graphene layers, wherein each graphene layer is arranged on and in direct contact with a respective conductive layer of the plurality of conductive layers; and a plurality of insulating layers, wherein each insulating layer is arranged between neighboring conductive layers of the plurality of conductive layers.

The multilayer stack includes planar conductive layers, planar graphene layers, and planar insulating layers. Winding 203 is formed by a first layer stack or a sub-stack of the multilayer stack and winding 204 is formed by a second layer stack or a sub-stack of the multilayer stack. The first and second layer stacks are formed in the same plane relative to each other. The multilayer stack includes a multilayer PCB whose PCB layers are used as insulating layers. Dielectric layers could also be used. The multilayer PCB enables the advantage that power-semiconductor components can also be placed the same PCB.

The first layer stack that forms winding 203 includes a first plurality of conductive layers M1, M2, M3, and M4 that form a first conductor structure, where neighboring conductive layers of the first plurality of conductive layers are connected by a respective connecting via 205. The planar conductive layers may be conductive wires or conductive bars. Insulating layers PCB1, PCB2, and PCB3 are each arranged between neighboring conductive layers of the first plurality of conductive layers. A connecting via 205 extends through a respective insulating layer (e.g., PCB1, PCB2, or PCB3) to directly connect two neighboring conductive layers (e.g., neighboring conductive layers M1 and M2, M2 and M3, or M3 and M4). While only four conductive layers are shown, winding 203 can be made up of more or less conductive layers depending on the number of turns desired for the winding 203, with each conductive layer corresponding to one turn. Connecting vias are provided to connect pairs of neighboring conductive layers so that the first plurality of conductive layers M1, M2, M3, and M4 and their respective connecting vias 205 form a continuous conductive structure (i.e., a continuous winding).

Thus, it can be said that winding 203 is formed from vertically overlapping metal layers. The minimum number of metal layers is one, while there is no real limit to the total number of metal layers as far it is practically manufacturable. Each metal layer of winding 203 is conductively coupled to an adjacent metal layer by a metal via or other metal structure that is formed in the sub-insulator layers located between the two adjacent metal layers.

The first layer stack that forms winding 203 further includes a graphene layer G1, G2, G3, and G4 for each conductive layer M1, M2, M3, and M4, respectively. Each graphene layer is arranged on and in direct contact with a respective conductive layer of the first plurality of conductive layers of winding 203. Thus, graphene layer G1 is deposited directly on a surface of conductive layer M1, graphene layer G2 is deposited directly on a surface of conductive layer M2, and so on. Each insulating layer of the first layer stack is arranged directly between a graphene layer and a conductive layer.

Each connecting via 205 is directly coupled to respective neighboring conductive layers of the first plurality of conductive layers and extends through a respective graphene layer and a respective insulating layer in order to couple the respective neighboring conductive layers of the first plurality of conductive layers together, thereby forming a first current path between the respective neighboring conductive layers of the first plurality of conductive layers for the primary current.

Similarly, the second layer stack that forms winding 204 includes a second plurality of conductive layers M1, M2, M3, and M4 that form a second conductor structure, where neighboring conductive layers of the second plurality of conductive layers are connected by a respective connecting via 206. The second layer stack may be formed from the same conductive layers as the first layer stack, though conductively isolated from each other. The planar conductive layers may be conductive wires or conductive bars. Insulating layers PCB1, PCB2, and PCB3 are each arranged between neighboring conductive layers of the second plurality of conductive layers. A connecting via 206 extends through a respective insulating layer (e.g., PCB1, PCB2, or PCB3) to directly connect two neighboring conductive layers (e.g., neighboring conductive layers M1 and M2, M2 and M3, or M3 and M4). While only four conductive layers are shown, winding 204 can be made up of more or less conductive layers depending on the number of turns desired for the winding 204, with each conductive layer corresponding to one turn. Connecting vias are provided to connect pairs of neighboring conductive layers so that the second plurality of conductive layers M1, M2, M3, and M4 and their respective connecting vias 206 form a continuous conductive structure (i.e., a continuous winding).

Thus, it can be said that winding 204 is formed from vertically overlapping metal layers. The minimum number of metal layers is one, while there is no real limit to the total number of metal layers as far it is practically manufacturable. Each metal layer of winding 204 is conductively coupled to an adjacent metal layer by a metal via or other metal structure that is formed in the sub-insulator layers located between the two adjacent metal layers.

The second layer stack that forms winding 204 further includes a graphene layer G1, G2, G3, and G4 for each conductive layer M1, M2, M3, and M4, respectively. Each graphene layer is arranged on and in direct contact with a respective conductive layer of the second plurality of conductive layers of winding 204. Thus, graphene layer G1 is deposited directly on a surface of conductive layer M1, graphene layer G2 is deposited directly on a surface of conductive layer M2, and so on. Each insulating layer of the second layer stack is arranged directly between a graphene layer and a conductive layer.

Each connecting via 206 is directly coupled to respective neighboring conductive layers of the second plurality of conductive layers and extends through a respective graphene layer and a respective insulating layer in order to couple the respective neighboring conductive layers of the second plurality of conductive layers together, thereby forming a second current path between the respective neighboring conductive layers of the second plurality of conductive layers for the secondary current.

The plurality of permanent magnets 205, 206, 207, 208, etc. are configured to interact with electromagnetic fields produced by respective phase currents flowing through the plurality of phase windings of the stator. The interaction of the electromagnetic fields with the permanent magnets 205, 206, 207, 208, etc. causes the rotor discs 211 and 212 to rotate about the stator shaft 201, which may have ball bearings therebetween to permit the rotation.

While graphene is shown to be provided on top of each conductive layer (i.e., in direct contact with an upper main surface thereof), it will be appreciated that another graphene layer could be provided in direct contact with a lower main surface of each conductive layer.

The motor built of PCB layers can also be improved by a magnetic back-bone structure to conduct magnetic field lines. PCB-motors typically have a low inductance therefore need a high switching frequency and the according magnetic core need to be of special material for high frequencies (e.g., ferrite).

Figure 3:
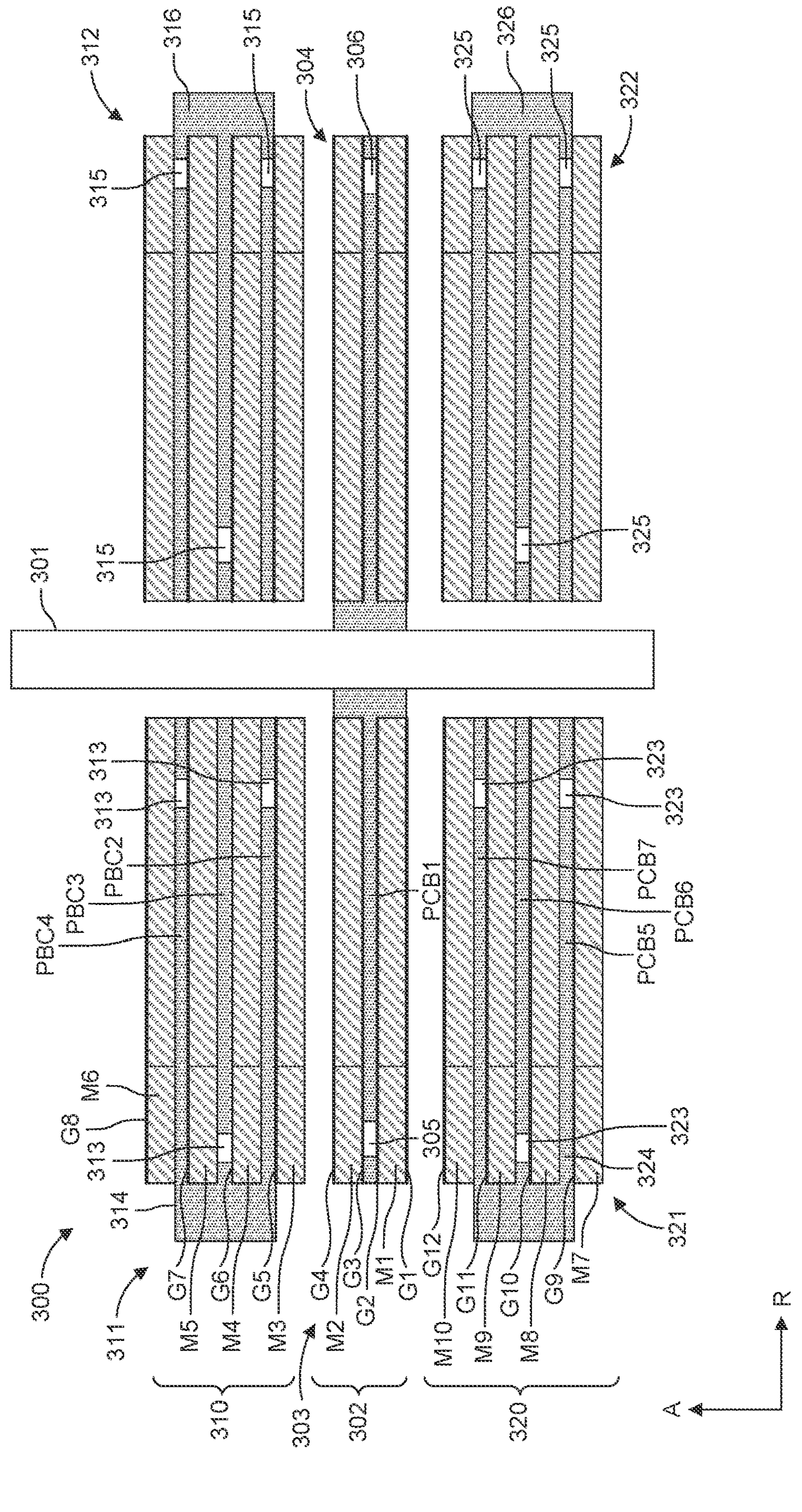
FIG. 3 shows a cross-sectional view of an induction system according to one or more embodiments.

FIG. 3 shows a cross-sectional view of an induction system 300 according to one or more embodiments. The induction system 300 may be an induction motor or an electric generator. Both an induction motor and an electric generator use the interaction of rotor and stator electromagnetic fields to rotate the rotor.

The induction system 300 comprises a rotor that includes a rotor shaft 301 that extends in an axial direction A and rotor disc 302 mechanically coupled to the rotor shaft 301 and extending in a radial direction R. The rotor disc 302 includes a plurality of shortcut windings 303 and 304, where each shortcut winding includes a conductor winding through which a respective induced current of a plurality of induced currents flows and a graphene layer arranged on the conductor winding in direct contact therewith. While only two shortcut windings are shown in the cross-sectional view, it will be appreciated that additional shortcut windings are formed around the rotor shaft 301.

The rotor disc 302 includes a rotor layer stack, with each shortcut windings 303, 304, etc. being formed by its own sub-stack of layers. For example, shortcut winding 303 is formed by a first layer stack or sub-stack of the multilayer stack and shortcut winding 304 is formed by a second layer stack or sub-stack of the multilayer stack.

The first layer stack that forms the shortcut winding 303 includes a first plurality of conductive layers M1 and M2 that form a conductor winding of the plurality of shortcut windings. Neighboring conductive layers of the first plurality of conductive layers M1 and M2 are connected by a respective first via 305. Connecting vias are provided to connect pairs of neighboring conductive layers so that the first plurality of conductive layers M1, M2, and their respective connecting vias 305 form a continuous conductive structure (i.e., a continuous winding).

The first layer stack also includes a first plurality of graphene layers G1, G2, G3, and G4. Each graphene layer G1, G2, G3, and G4 of the first plurality of graphene layers is arranged on and in direct contact with a respective conductive layer M1 or M2 of the first plurality of conductive layers. Here, both upper and lower main surfaces of conductive layers M1, M2 are covered with graphene. Thus, the first layer stack has a similar structure to those layer stacks described above.

The first layer stack also includes at least one insulating layer (e.g., PCB1). Each insulating layer is arranged between neighboring conductive layers of the first plurality of conductive layers M1, M2, etc. Here, insulating layer PCB1 is arranged between conductive layers M1 and M2 and, more specifically, between graphene layers G2 and G3. The insulating layer PCB1 may be part of a multilayer PCB whose PCB layers are used as insulating layers. Dielectric layers could also be used. The multilayer PCB enables the advantage that power-semiconductor components can also be placed the same PCB.

Each connecting via 305 is directly coupled to respective neighboring conductive layers of the first plurality of conductive layers and extends through a respective graphene layer and a respective insulating layer in order to couple the respective neighboring conductive layers of the first plurality of conductive layers together, thereby forming a first current path between the respective neighboring conductive layers of the first plurality of conductive layers for an induced current to flow.

The second layer stack that forms the shortcut winding 304 has a similar stack structure as the first layer stack. Neighboring conductive layers of the first plurality of conductive layers M1 and M2 are connected by a respective second via 306. Connecting vias are provided to connect pairs of neighboring conductive layers so that the first plurality of conductive layers M1, M2, and their respective connecting vias 306 form a continuous conductive structure (i.e., a continuous winding). Each connecting via 306 is directly coupled to respective neighboring conductive layers of the first plurality of conductive layers and extends through a respective graphene layer and a respective insulating layer in order to couple the respective neighboring conductive layers of the first plurality of conductive layers together, thereby forming a second current path between the respective neighboring conductive layers of the first plurality of conductive layers for an induced current to flow.

The induction system 300 further comprises a stator that includes a first stator disc 310 and a second stator disc 320 that are rotationally fixed.

The first stator disc 310 includes a plurality of first stator phase windings (e.g., stator phase windings 311 and 312), each of which includes a conductor winding through which a respective first stator phase current of a plurality of first stator phase currents flows and a graphene layer arranged on the conductor winding in direct contact therewith. For example, for a 3-phase motor, the first stator phase currents would include three stator phase currents that are driven in assigned windings according to a motor driving scheme. Each conductor winding of the first stator phase windings is made up of a plurality of conductive layers M3, M4, M5, and M6 that are coated with a respective graphene layer G5, G6, G7, and G8. While only two first stator phase windings are shown in the cross-sectional view, it will be appreciated that additional first stator phase windings are formed around the rotor shaft 301.

The first stator disc 310 includes a stator layer stack, with each first stator phase windings 311, 312, etc. being formed by its own sub-stack of layers. For example, shortcut winding 311 is formed by a first layer stack or sub-stack of the multilayer stack and shortcut winding 312 is formed by a second layer stack or sub-stack of the multilayer stack.

The first layer stack that forms the first stator phase winding 311 includes a second plurality of conductive layers M3-M6 that form a conductor winding of the plurality of first stator phase windings. Neighboring conductive layers of the second plurality of conductive layers M3-M6 are connected by a respective third via 313. Connecting vias are provided to connect pairs of neighboring conductive layers so that the second plurality of conductive layers M3-M6 and their respective connecting vias 313 form a continuous conductive structure (i.e., a continuous winding).

The first layer stack also includes a second plurality of graphene layers G5-G8. Each graphene layer G5, G6, G7, and G8 of the second plurality of graphene layers is arranged on and in direct contact with a respective conductive layer M5-M8 of the second plurality of conductive layers. Here, both upper main surfaces of conductive layers M5-M8 are covered with graphene. Thus, the first layer stack of the first stator disc 310 has a similar structure to those layer stacks described above.

The first layer stack of the first stator disc 310 also includes insulating layers PBC2, PBC3, and PBC4. Each insulating layer PBC2, PBC3, and PBC4 is arranged between neighboring conductive layers of the second plurality of conductive layers M5-M8. The insulating layers insulating layers PBC2, PBC3, and PBC4 may be part of a multilayer PCB 314 whose PCB layers are used as insulating layers. Dielectric layers could also be used. The multilayer PCB 314 enables the advantage that power-semiconductor components can also be placed the same PCB.

Each connecting via 313 is directly coupled to respective neighboring conductive layers of the second plurality of conductive layers and extends through a respective graphene layer and a respective insulating layer in order to couple the respective neighboring conductive layers of the second plurality of conductive layers together, thereby forming a current path between the respective neighboring conductive layers of the second plurality of conductive layers for a respective first stator phase current to flow.

The second layer stack that forms the first stator phase winding 312 likewise includes a second plurality of conductive layers M3-M6 that form a conductor winding of the plurality of first stator phase windings. Neighboring conductive layers of the second plurality of conductive layers M3-M6 are connected by a respective fourth via 315. Connecting vias are provided to connect pairs of neighboring conductive layers so that the second plurality of conductive layers M3-M6 and their respective connecting vias 315 form a continuous conductive structure (i.e., a continuous winding).

The second layer stack also includes a second plurality of graphene layers G5-G8. Each graphene layer G5, G6, G7, and G8 of the second plurality of graphene layers is arranged on and in direct contact with a respective conductive layer M5-M8 of the second plurality of conductive layers. Here, both upper main surfaces of conductive layers M5-M8 are covered with graphene. Thus, the second layer stack of the first stator disc 310 has a similar structure to those layer stacks described above.

The second layer stack of the first stator disc 310 also includes insulating layers PBC2, PBC3, and PBC4. Each insulating layer PBC2, PBC3, and PBC4 is arranged between neighboring conductive layers of the second plurality of conductive layers M5-M8. The insulating layers insulating layers PBC2, PBC3, and PBC4 may be part of a multilayer PCB 316 whose PCB layers are used as insulating layers. Dielectric layers could also be used. The multilayer PCB 316 enables the advantage that power-semiconductor components can also be placed the same PCB. The multilayer PCBs 314 and 316 may be formed from single multilayer PCB with a one-piece integral construction.

Each connecting via 315 is directly coupled to respective neighboring conductive layers of the second plurality of conductive layers and extends through a respective graphene layer and a respective insulating layer in order to couple the respective neighboring conductive layers of the second plurality of conductive layers together, thereby forming a current path between the respective neighboring conductive layers of the second plurality of conductive layers for a respective first stator phase current to flow.

The second stator disc 320 has a similar structure to that of the first stator disc 310, with the rotor disc 302 being arranged between the first stator disc 310 and the second stator disc 320. The first stator disc 312 includes a plurality of second stator phase windings (e.g., stator phase windings 321 and 322), each of which includes a conductor winding through which a respective second stator phase current of a plurality of second stator phase currents flows and a graphene layer arranged on the conductor winding in direct contact therewith. For example, for a 3-phase motor, the second stator phase currents would include three stator phase currents that are driven in assigned windings according to a motor driving scheme. Each second stator phase current is activated with a corresponding first stator phase current (e.g., with opposite polarity). Each conductor winding of the second stator phase windings is made up of a plurality of conductive layers M7, M8, M9, and M10 that are coated with a respective graphene layer G9, G10, G11, and G12. While only two second stator phase windings are shown in the cross-sectional view, it will be appreciated that additional second stator phase windings are formed around the rotor shaft 301.

The second stator disc 320 includes a stator layer stack, with each second stator phase windings 321, 322, etc. being formed by its own sub-stack of layers. For example, shortcut winding 321 is formed by a first layer stack or sub-stack of the multilayer stack and shortcut winding 322 is formed by a second layer stack or sub-stack of the multilayer stack.

The first layer stack that forms the second stator phase winding 321 includes a third plurality of conductive layers M7-M10 that form a conductor winding of the plurality of second stator phase winding. Neighboring conductive layers of the third plurality of conductive layers M7-M10 are connected by a respective fifth via 323. Connecting vias are provided to connect pairs of neighboring conductive layers so that the second plurality of conductive layers M7-M10 and their respective connecting vias 323 form a continuous conductive structure (i.e., a continuous winding).

The first layer stack also includes a third plurality of graphene layers G9-G12. Each graphene layer G9, G10, G11, and G12 of the third plurality of graphene layers is arranged on and in direct contact with a respective conductive layer M7-M10 of the third plurality of conductive layers. Here, the upper main surfaces of conductive layers M7-M10 are covered with graphene. Thus, the first layer stack of the second stator disc 320 has a similar structure to those layer stacks described above.

The first layer stack of the first stator disc 320 also includes insulating layers PBC5, PBC6, and PBC7. Each insulating layer PBC5, PBC6, and PBC7 is arranged between neighboring conductive layers of the third plurality of conductive layers M7-M10. The insulating layers insulating layers PBC5, PBC6, and PBC7 may be part of a multilayer PCB 324 whose PCB layers are used as insulating layers. Dielectric layers could also be used. The multilayer PCB 324 enables the advantage that power-semiconductor components can also be placed the same PCB.

Each connecting via 323 is directly coupled to respective neighboring conductive layers of the second plurality of conductive layers and extends through a respective graphene layer and a respective insulating layer in order to couple the respective neighboring conductive layers of the second plurality of conductive layers together, thereby forming a current path between the respective neighboring conductive layers of the second plurality of conductive layers for a respective first stator phase current to flow.

The second layer stack that forms the second stator phase winding 322 likewise includes a third plurality of conductive layers M7-M10 that form a conductor winding of the plurality of first stator phase windings. Neighboring conductive layers of the third plurality of conductive layers M7-M10 are connected by a respective sixth via 325. Connecting vias are provided to connect pairs of neighboring conductive layers so that the third plurality of conductive layers M7-M10 and their respective connecting vias 325 form a continuous conductive structure (i.e., a continuous winding).

The second layer stack also includes a third plurality of graphene layers G9-G12. Each graphene layer G9, G10, G11, and G12 of the third plurality of graphene layers is arranged on and in direct contact with a respective conductive layer M7-M10 of the third plurality of conductive layers. Here, the upper main surfaces of conductive layers M7-M10 are covered with graphene. Thus, the second layer stack of the second stator disc 320 has a similar structure to those layer stacks described above.

The second layer stack of the second stator disc 320 also includes insulating layers PBC5, PBC6, and PBC7. Each insulating layer PBC5, PBC6, and PBC7 is arranged between neighboring conductive layers of the second plurality of conductive layers M7-M10. The insulating layers insulating layers PBC5, PBC6, and PBC7 may be part of a multilayer PCB 326 whose PCB layers are used as insulating layers. Dielectric layers could also be used. The multilayer PCB 326 enables the advantage that power-semiconductor components can also be placed the same PCB. The multilayer PCBs 324 and 326 may be formed from single multilayer PCB with a one-piece integral construction.

Each connecting via 325 is directly coupled to respective neighboring conductive layers of the third plurality of conductive layers and extends through a respective graphene layer and a respective insulating layer in order to couple the respective neighboring conductive layers of the third plurality of conductive layers together, thereby forming a current path between the respective neighboring conductive layers of the third plurality of conductive layers for a respective second stator phase current to flow.

While graphene is shown to be provided on top of each conductive layer (i.e., in direct contact with an upper main surface thereof), it will be appreciated that another graphene layer could be provided in direct contact with a lower main surface of each conductive layer.

During operation, the plurality of first stator phase currents and the plurality of second stator phase currents induce the plurality of induced currents in the plurality of shortcut windings. Specifically, the plurality of first stator phase currents and the plurality of second stator phase currents generate a stator magnetic field and the plurality of induced currents generate a rotor magnetic field that interacts with the stator magnetic field to cause the rotor to rotate. Specifically, because the rotor is located in the rotating magnetic field of the stator, the lines of magnetic flux that are produced will cut the shortcut windings (i.e., the rotor windings) and induce a voltage therein. This will in turn result in an induced current flowing in the shortcut windings, which will generate its own magnetic field around the shortcut windings. This magnetic field interacts with the stator magnetic field to produce a force on the shortcut windings, causing the rotor to rotate around its axis.

When used as an induction motor, the induction motor behaves like transformers. There the secondary-side wiring is rotating, but can be very low-ohmic because the secondary-side voltage is generated by the frequency-difference between the 3-phase stator frequency and rotating secondary frequency. This induction motor can be also improved by magnetic materials (e.g., ferrite) for conducting the magnetic fields like that shown in FIG. 2A. In other words, the motor built of PCB layers can also be improved by a magnetic back-bone structure to conduct magnetic field lines. PCB-motors typically have a low inductance therefore need a high switching frequency and the according magnetic core need to be of special material for high frequencies (e.g., ferrite).

Low weight motor drives are required for all kind of avionic applications as well as cobots where fast reaction times are required, which can be enabled by low inertia by low mass. Moreover, the low inductance of axial-flux motors requires high switching frequencies. These high switching frequencies can be realized with wide bandgap devices equipped inverters (GaN, SiC). The graphene layers disposed directly on conductive windings provide high or increased electrical and thermal conductivity. The conductivity will be increased in DC but also in case of high frequencies where the current is transported on the surface of the conductive layers due to skin effects. Also, the size of motors can be reduced by using coreless stators with reduced thickness. This increases the effectivity and efficiency of this type of motor.

While various embodiments have been disclosed, it will be apparent to those skilled in the art that various changes and modifications can be made which will achieve some of the advantages of the concepts disclosed herein without departing from the spirit and scope of the invention. Thus, it will be obvious to those reasonably skilled in the art that other components performing the same or similar functions may be suitably substituted. It is to be understood that other embodiments may be utilized and structural or logical changes may be made without departing from the scope of the present invention. It should be mentioned that features explained with reference to a specific figure may be combined with features of other figures, even in those not explicitly mentioned. Such modifications to the general inventive concept are intended to be covered by the appended claims and their legal equivalents.

Furthermore, the following claims are hereby incorporated into the detailed description, where each claim may stand on its own as a separate example embodiment. While each claim may stand on its own as a separate example embodiment, it is to be noted that—although a dependent claim may refer in the claims to a specific combination with one or more other claims—other example embodiments may also include a combination of the dependent claim with the subject matter of each other dependent or independent claim. Such combinations are proposed herein unless it is stated that a specific combination is not intended. Furthermore, it is intended to include also features of a claim to any other independent claim even if this claim is not directly made dependent on the independent claim.

It is further to be noted that methods disclosed in the specification or in the claims may be implemented by a device having means for performing each of the respective acts of these methods. For example, the techniques described in this disclosure may be implemented, at least in part, in hardware, software, firmware, or any combination thereof, including any combination of a computing system, an integrated circuit, and a computer program on a non-transitory computer-readable recording medium. For example, various aspects of the described techniques may be implemented within one or more processors, including one or more microprocessors, DSPs, ASICs, or any other equivalent integrated or discrete logic circuitry, as well as any combinations of such components.

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some embodiments, a single act may include or may be broken into multiple sub acts. Such sub acts may be included and part of the disclosure of this single act unless explicitly excluded.

What is claimed is:

1. A transformer, comprising:

a first winding configured to carry a first current, wherein the first winding comprises a first conductor structure through which the first current flows and a first graphene layer arranged in direct contact with the first conductor structure; and a second winding arranged on and magnetically coupled to the first winding and configured to carry a second current, wherein the second winding comprises a second conductor structure through which the second current flows and a second graphene layer arranged in direct contact with the second conductor structure, wherein the transformer is a planar transformer comprising a multilayer stack of a plurality of layers with the second winding being stacked on top of the first winding in a vertical arrangement, wherein the plurality of layers includes a first layer stack that forms the first winding, a second layer stack that forms the second winding, and at least one separating insulating layer coupled to and interposed vertically between the first layer stack and the second layer stack, wherein the first layer stack comprises:

a first plurality of conductive layers that form the first conductor structure, wherein neighboring conductive layers of the first plurality of conductive layers are connected by a respective first via;

a first plurality of graphene layers, wherein each graphene layer of the first plurality of graphene layers is arranged on and in direct contact with a respective conductive layer of the first plurality of conductive layers; and at least one first insulating layer, wherein each first insulating layer is arranged between neighboring conductive layers of the first plurality of conductive layers, wherein the second layer stack comprises:

a second plurality of conductive layers that form the second conductor structure, wherein neighboring conductive layers of the second plurality of conductive layers are connected by a respective second via;

a second plurality of graphene layers, wherein each graphene layer of the second plurality of graphene layers is arranged on and in direct contact with a respective conductive layer of the second plurality of conductive layers; and at least one second insulating layer, wherein each second insulating layer is arranged between neighboring conductive layers of the second plurality of conductive layers.

2. The transformer of claim 1, wherein the at least one separating insulating layer, the at least one first insulating layer, and the at least one second insulating layer are printed circuit board (PCB) layers.

3. The transformer of claim 1, wherein:

each respective first via is directly coupled to respective neighboring conductive layers of the first plurality of conductive layers and extends through a respective graphene layer of the first plurality of graphene layers and a respective first insulating layer of the at least one first insulating layer in order to couple the respective neighboring conductive layers of the first plurality of conductive layers together, thereby forming a first current path between the respective neighboring conductive layers of the first plurality of conductive layers for the first current, and each respective second via is directly coupled to respective neighboring conductive layers of the second plurality of conductive layers and extends through a respective graphene layer of the second plurality of graphene layers and a respective second insulating layer of the at least one second insulating layer in order to couple the respective neighboring conductive layers of the second plurality of conductive layers together, thereby forming a second current path between the respective neighboring conductive layers of the second plurality of conductive layers for the second current.

* * * * *